United States Patent [19]

Downs, Jr. et al.

[11] 4,418,719
[45] Dec. 6, 1983

[54] AIR CONTROL APPARATUS

[76] Inventors: Edward T. Downs, Jr., 5873 Trotter La., West Bloomfield, Mich. 48033; Julius Komorek, 15658 Williams, Livonia, Mich. 48154

[21] Appl. No.: 210,848

[22] Filed: Nov. 26, 1980

[51] Int. Cl.³ ............................................. F16K 47/14
[52] U.S. Cl. .............................. 137/625.31; 251/127; 98/41 R; 98/41 AV
[58] Field of Search ....................... 251/305, 127, 118; 137/625.31, 601; 98/41 R, 41 AV, 40 D

[56] References Cited

U.S. PATENT DOCUMENTS

| | | | |
|---|---|---|---|
| 3,640,307 | 2/1972 | Drzala | 137/601 X |
| 3,718,081 | 2/1973 | Root | 137/601 X |
| 3,750,839 | 8/1973 | McNabney | |
| 3,901,135 | 8/1975 | Nilsson et al. | 98/41 R |
| 4,100,938 | 7/1978 | Dravnieks et al. | 251/118 |

FOREIGN PATENT DOCUMENTS 402707 2/1974 U.S.S.R. ............................. 251/127

Primary Examiner—Arnold Rosenthal
Attorney, Agent, or Firm—Harness, Dickey & Pierce

[57] ABSTRACT

An improved variable volume air controller for use in conjunction with a conditioned air distribution system is disclosed which comprises an insulated lined housing having an inlet, an outlet, and a control assembly operative to vary the volume of air flowing therethrough. An air flow diffuser is also provided being positioned in overlying relationship to the inlet opening which operates to substantially improve air flow distribution over the cross sectional area of the housing whereby the control assembly may operate to provide improved relatively noise-free modulation of air flow. Additionally, a stop assembly is provided which cooperates with a portion of the control assembly to limit movement thereof beyond a true full open position as well as to inhibit air flow induced vibration thereof when the control assembly is in a full open position.

15 Claims, 2 Drawing Figures

U.S. Patent  Dec. 6, 1983  Sheet 1 of 2  4,418,719
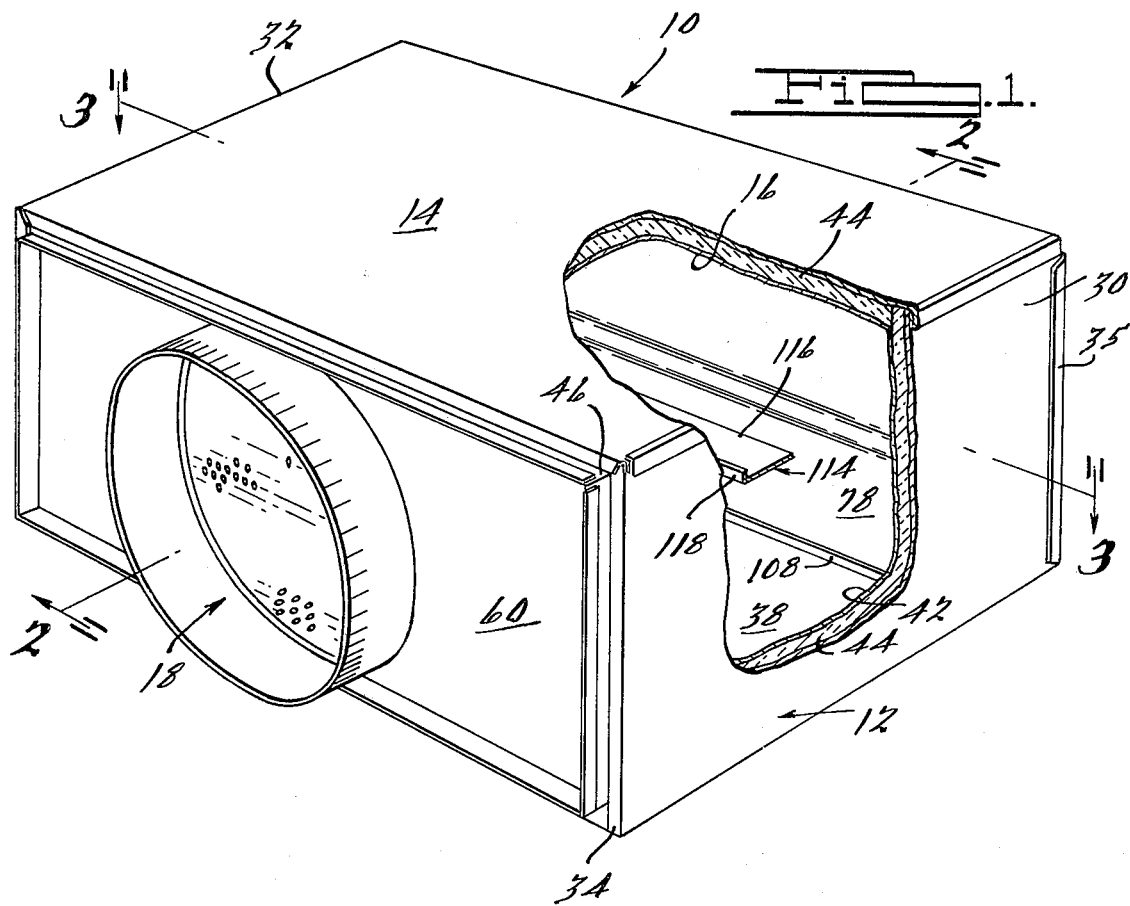
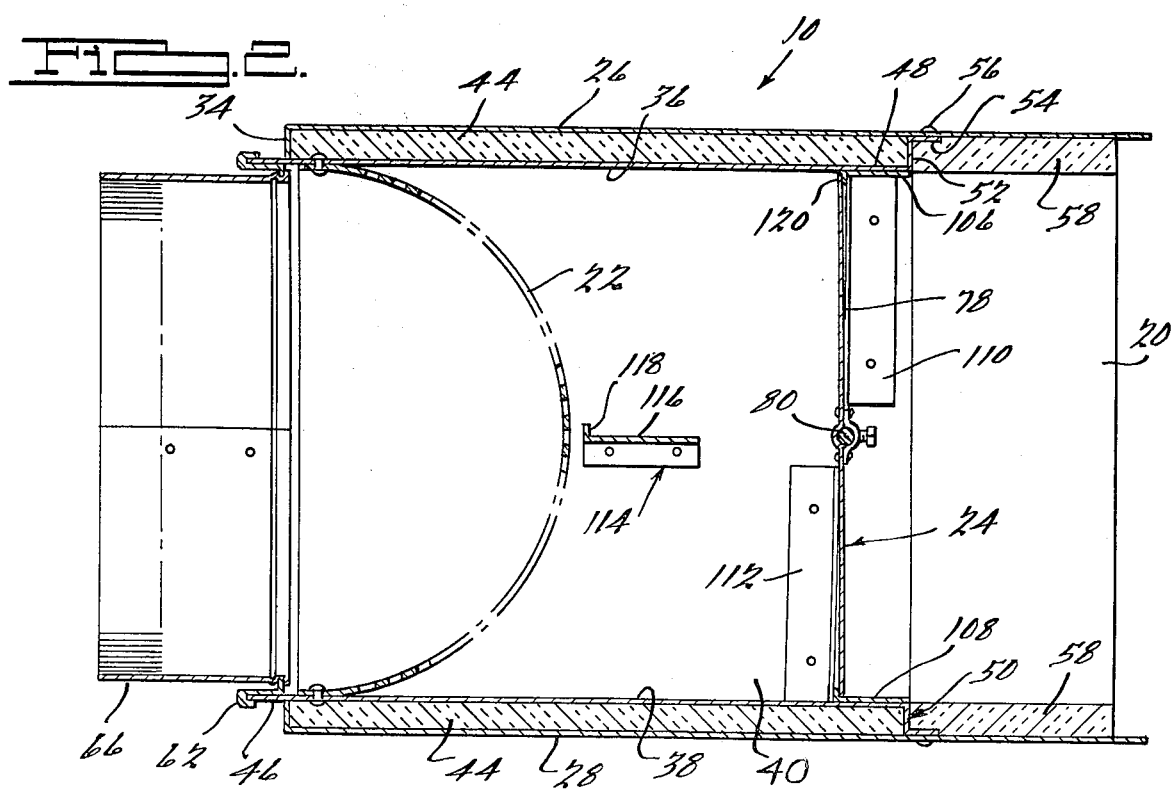

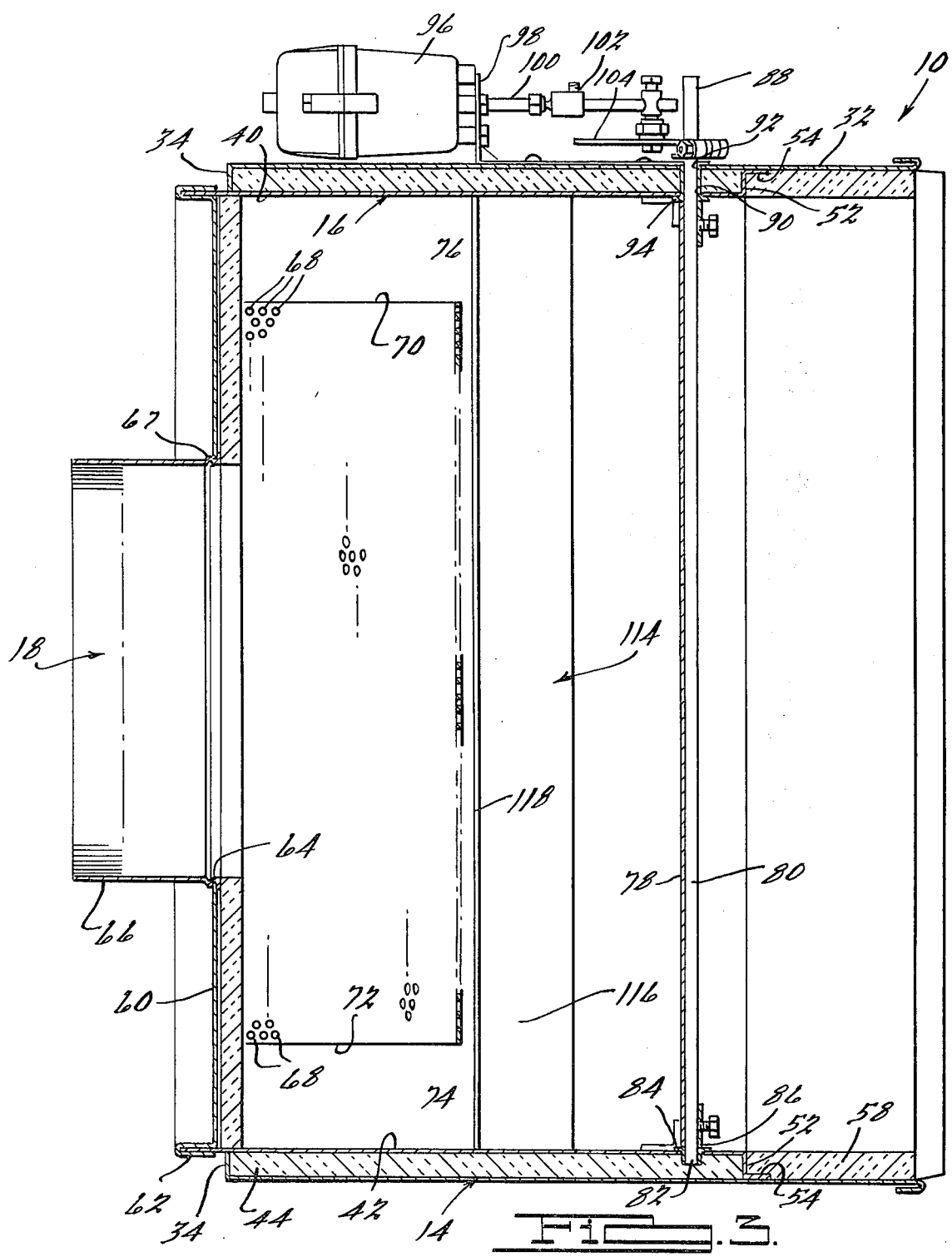
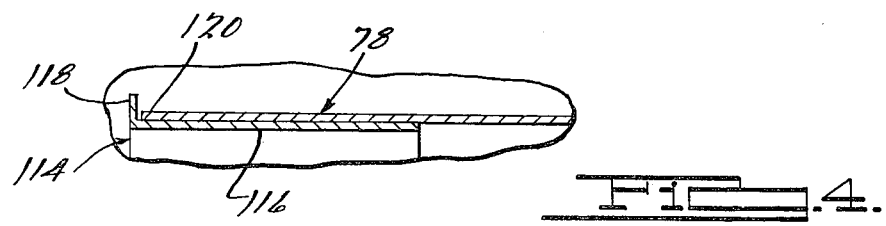

AIR CONTROL APPARATUS

BACKGROUND AND SUMMARY OF THE INVENTION

The present invention relates generally to control apparatus for use in conjunction with conditioned air distribution systems which are employed for heating, cooling and ventilating of buildings and more particularly to an improved variable volume air controller for use in conjunction with such systems.

In heating and cooling of various types of buildings it is common practice to provide one or sometimes more central heating and/or cooling units which operate to deliver a supply of conditioned (either heated or cooled) air to various locations via a duct work system. In one type of system, the heating/cooling unit is operative to continuously provide a supply of air at a substantially constant temperature. In order to control the temperature of the various locations within the building the duct work system is provided with one or more individually controlled variable volume air controllers which operate to vary the volume of the conditioned air which is being delivered therethrough to the various locations. Typically, actuation of the volume air controllers will be controlled by thermostats located within the spaces to which the controller is delivering the conditioned air.

Basically, these variable volume air controllers comprise a housing having an inlet and an outlet connected respectively to supply and delivery portions of a duct work system and a motor driven damper within the housing. The motor drive system will be controlled by a thermostat or other suitable means and operates to position the damper at substantially any setting between and including fully open or fully closed positions so as to modulate the flow of air therethrough.

In order to facilitate modulation of the air flow, the cross sectional area of the volume control housing is typically significantly greater than that of the inlet opening provided therein. Hence, it is desirable to provide means to improve the distribution or diffusion of the air flow entering the housing over the entire cross sectional area so as to enable the damper to more effectively and efficiently modulate the air flow. Further, because the delivery duct work system opens directly into the spaces to be heated or cooled any noise produced as a result of operation of the air controller will most likely be very noticeable and possibly annoying to occupants of those spaces. Accordingly, it is very desirable to design the air controller in such a manner that it will offer substantially noise-free operation both in terms of wind noise which may result from modulation of the air flow as well as vibration of the various components forming a part of the air controller. Additionally, because the duct work system is often located in spaces within the building which are substantially closed off or sealed from the spaces to which the conditioned air is to be supplied, it is desirable that the air controller be substantially sealed so as to prevent leakage of the conditioned air therefrom. Conflicting with this objective, however, is the need to attach various support devices such as hangers and the like to the housing in order to support the air controller which may require puncturing the outer shell thereof.

The present invention, however, provides a substantially improved variable volume air controller which is designed to overcome these problems and provide an extremely quiet and efficient air controller capable of providing substantially noise-free modulation of air flow over substantially the entire range of operation. The variable volume air controller of the present invention comprises an outer shell having a liner fitted therein the sidewalls of which are spaced from the sidewalls of the outer liner so as to prevent penetration of any fastening devices into the interior of the controller and thus reduce resulting air leakage therethrough. Improved air diffusion means is also provided within the controller which operates to distribute the incoming air flow in such a manner as to provide a velocity profile which facilitates efficient relatively noise-free modulation of the air flow over substantially the entire range of operation of the damper. Additionally, stop means are also provided within the air controller which is engageable with the damper so as to prevent movement thereof beyond a full open position. This stop means thus prevents possible misadjustment of drive linkage which could result in the damper being driven beyond a full open position and thus reduce maximum air flow when in fact the control means is signalling for delivery of maximum conditioned air to the spaces. The stop means also includes an air flow deflector which is designed to deflect air flow which would otherwise impinge on the leading edge of the damper when in a full open position thus creating the possibility of noise producing flutter or vibration of the damper. The present invention is also designed to enable inlet plates having different size inlet openings to be easily and conveniently attached to an otherwise completely assembled air controller. Thus, it is possible for a distributor to stock a standard size air controller and to fit an inlet plate thereto having an inlet opening particularly suited for the specific job as opposed to requiring stocking of a variety of different size air controllers. Thus, the present invention provides a variable volume air controller which offers significant advantages over presently available units.

Additional advantages and features of the present invention will become apparent from the subsequent description and the appended claims taken in conjunction with the accompanying drawings.

BRIEF DESCRIPTION OF THE DRAWINGS

FIG. 1 is a perspective view of a variable volume air controller in accordance with the present invention, portions thereof being broken away;

FIG. 2 is a sectioned view of the air controller of FIG. 1, the section being taken along line 2—2 thereof;

FIG. 3 is another sectioned view of the air controller of FIG. 1, the section being taken along line 3—3 thereof; and FIG. 4 is a fragmentary sectioned view of a portion of the air controller of FIG. 1 showing the stop member provided therein with the damper in engaging relationship therewith.

DESCRIPTION OF THE PREFERRED EMBODIMENT

Referring now to the drawings and in particular to FIGS. 1 and 2, there is shown a variable volume air controller 10 in accordance with the present invention which comprises a housing 12 including an outer shell 14 and a liner 16, an inlet 18 at one end thereof and an outlet 20 at the other end. Diffusion means 22 and air flow control means 24 are also provided being disposed within housing 12.

Outer shell 14 is preferably fabricated from a single sheet of a suitable sheet metal such as a galvanized steel for example which is formed to define a chamber having a generally rectangular cross sectional shape open at both ends including substantially parallel spaced upper and lower wall portions 26 and 28 and substantially parallel spaced interconnecting sidewall portions 30 and 32. A peripheral flange portion 34 is also formed around one end of outer shell 14 projecting inwardly at generally right angels to the respective wall portions. Sidewalls 30 and 32 may be provided with a generally parallel extending outwardly spaced flange 35 at the opposite end from peripheral flange 34 to facilitate attachment of outlet 20 to the delivery duct system if desired.

Liner 16 is similarly preferably formed from a single piece of a suitable sheet metal and has a substantially identical shape although of slightly smaller dimensions so as to enable it to be fitted within shell 14 and includes upper and lower walls 36 and 38 and interconnecting sidewalls 40 and 42. As shown in FIG. 2, the height and width of liner 16 will be approximately equal to the opening defined by peripheral flange portion 34 and thus respective wall portions 36, 38, 40, and 42 are spaced from wall portion 26, 28, 32, and 30. A layer of a suitable insulation material 44 is disposed with the space between the respective wall portions of liner 16 and outer shell 14 so as to inhibit heat transfer into or out of the chamber defined thereby.

As best seen with reference to FIG. 2, peripheral flange portion 34 is operative to support one end 46 of liner 16 which projects outwardly therefrom while the other end 48 of liner 16 is provided with a generally L-shaped outwardly projecting peripheral flange portion 50 including legs 52 and 54 which are so dimensioned as to place leg portion 54 in supporting engagement with wall portions 26, 28, 30, and 32 of outer shell 14. Suitable fasteners such as pop rivets 56 may be used to secure leg portion 54 to respective sidewall portions 26, 28, 30, and 32 so as to secure liner 16 in assembled relationship with shell 14. Preferably, liner 16 will have a depth less than that of outer shell 14 so as to avoid interfering with the attachment of air controller 10 to a delivery duct work system and additional suitable insulating material 58 may be applied to the inner surface of the outer shell wall portions extending beyond liner 16.

Thus, as seen in FIGS. 2 and 3, air flow through the air controller will be substantially fully contained within liner 16 and because of the spacing between the sidewalls of liner 16 and shell 14, fasteners used to attach hangers or other supporting devices to the air controller will only penetrate the walls of the outer shell 14 thus eliminating the possibility of air leakage resulting therefrom.

An inlet plate 60 is adapted to be secured to outwardly projecting end portion 46 of liner 16 by means of a generally U-shaped peripheral flange portion 62 provided thereon which is adapted to receive end portion 46 of liner 16. Preferably a suitable sealant or caulking material will be applied to this joint to prevent air leakage therefrom and suitable fasteners installed to securely attach inlet plate 16 to liner 46. Inlet plate 60 has an opening 64 provided therein within which a relatively short connector section of duct pipe 66 is fitted. As shown in FIG. 3, connector section 66 is provided with an annular outwardly projecting bead 67 adapted to abut the outer surface of inlet plate 60 and has the inner end thereof folded over the inner surface of inlet plate 60 so as to form a secure attachment therebetween. Again, a suitable sealant may be applied at this joint to prevent possible air leakage therefrom. Connector section 66 may be of any suitable size and shape required to enable air controller 10 to be connected to supply duct work of a conditioned air system. Thus, because inlet plate 60 is in the form of a separately attachable member which is designed so as to be secured to liner 16 relatively easily, it is possible for a distributor to stock only a single standard or universal size air controller without inlet plate 60 attached thereto and to then cut the desired size and shape opening therein necessary to fit the intended application. This feature offers significant economic advantages to the distributor in terms of reducing the required capital investment in inventory as well as reducing the required warehouse space while still enabling air controllers to be provided suitable for a full range of supply duct system sizes.

As previously mentioned, diffusion means 22 is provided within liner 16 and preferably comprises a sheet metal member having a relatively large number of closely spaced relatively small openings 68 therein. Diffusion member 22 is generally rectangular in shape and extends between and is secured to upper and lower wall portions of liner 16. The height of diffusion member 22 is substantially greater than distance between upper and lower wall portions 36 and 38 of liner 16 and will thus be formed to a generally arcuate contour when installed in overlying spaced relationship to opening 18 so as to present a generally concave surface to the air flowing through inlet opening 18. Diffusion member 22 also has a width less than the width of liner 16 but substantially wider than inlet opening 18 so as to position opposite lateral edge portions 70 and 72 in spaced relationship to sidewalls 40 and 42. Thus, a pair of substantially unrestricted passages 74 and 76 are provided around the opposite lateral edges of diffusion member adjacent opposite sidewalls so as to distribute air flow more evenly across substantially the entire transverse width of air controller 10. Additionally, because of the concave contour presented to the air flow entering through inlet 18 diffusion member 22 will also tend to produce a maximum velocity air flow rate approximately midway between upper and lower sidewalls 36 and 38 because the plane of the openings provided in the diffusion member will be oriented at substantially right angles to the direction of air flow through inlet openings along this transverse midline thus presenting a greater effective open area than the openings adjacent either the upper or lower sidewalls 36 and 38 which lie in a plane angularly related to the direction of air flow through inlet 18.

As best seen with reference to FIGS. 2 and 3, air flow control means 24 provided within air controller 10 comprises a damper 78 supportingly non-rotatably secured to a rotatable actuating shaft 80. Damper 78 is generally rectanguar in shape and of a size so as to substantially close off air flow through controller 10 when in a fully closed position as shown in FIG. 2.

Actuating shaft 80 has one end 82 rotatably supported in a suitable bearing 84 fitted within an opening 86 in sidewall 42 of liner 16 while the other end 88 extends outwardly through openings 90 and 92 in sidewalls 40 and 32 of liner 16 and outer shell 14 respectively and is rotatably supported therein by another suitable bearing 94.

A drive motor 96 which may be either pneumatically or electrically operated is secured to sidewall 32 of outer shell by means of a support bracket 98 and has an output shaft 100 connected by suitable adjustable linkage means 102 to a crank arm 104 secured to end 88 of actuating shaft 80. Thus, drive motor 96 may operate to rotatably drive actuating shaft 80 so as to continuously vary the position of the damper secured thereto between a fully closed position and a fully open position in accordance with the demand for delivery of condition air to the spaces being supplied thereby. Preferably, drive motor 96 will include internal biasing means operative to maintain the damper in a fully closed position when it is not energized although suitable external biasing means may be provided if desired.

In order to limit movement of damper 78 beyond the fully closed position as shown, a pair of generally "L"-shaped flange members 106 and 108 are secured to upper and lower sidewalls 36 and 38. Similarly, two pairs of "L"-shaped flange members 110 and 112 are provided, one pair being secured to sidewall 40 above and below actuating rod 80 generally as shown in FIG. 2 and the other being similarly secured to sidewall 42. These flange members are positioned so as to prevent movement of damper beyond a plane lying generally perpendicular to sidewalls 36 and 38.

A generally L-shaped stop member 114 is also provided extending transversely between and being supportingly secured to opposite sidewalls 40 and 42. Stop member 114 includes a first leg portion 116 positioned in a plane lying generally parallel to upper and lower sidewalls 36 and 38 and passing through the rotational axis of damper 78 which is engageable with the leading edge 120 of damper 78 when damper 78 is moved to a fully open position such as is shown in FIG. 4 so as to prevent overtravel thereof. A second relatively short leg portion 118 projects upwardly in the direction of approach of damper 78 from leg portion 116 at substantially a right angle thereto and has a width somewhat greater than the thickness of damper 78. Leg portion 116 operates to deflect air flow away from the leading edge 120 of the damper 78 so as to prevent possible flutter or vibration thereof which could result in annoying noise production thereby.

As previously mentioned, air flow entering air controller 10 via inlet opening 18 will have a maximum velocity approximately midway between upper and lower walls 36 and 38 and will be more uniformly distributed transversely across the full width of the air controller due to the interaction with diffusion member 22. This distribution offers several advantages in facilitating effective modulation of the air flow. For example because of the centralizing of the maximum velocity air flow, the greatest forces acting on damper 78 will be located immediately adjacent the rotational axis thereof which because of the reinforcing effect of the actuating rod 80 will be the strongest portion thereof. Further, because of the proximity of these forces to the location of the rotational axis, only relatively small moment arms result therefrom. Additionally, the low volume modulation of air flow is greatly facilitated because of the lower velocity air flow adjacent the upper and lower walls 36 and 38. Thus, the percentage increase in air flow volume will be more evenly distributed over the full range of damper operation thus allowing more accurate modulation even at very low flow rates. This also aids in reduction of wind noise even at very small damper opening positions.

Thus, as is apparent, the present invention provides a substantially improved variable volume air controller which provides for improved modulation over the entire operational range with lower attendant noise levels than previously available units.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

We claim:

1. An air distribution apparatus for providing and controlling a supply of conditioned air to one or more spaces, said apparatus comprising:
    an air receiving chamber having an inlet and an outlet spaced from said inlet, said chamber having a cross sectional size substantially larger than the cross section of said inlet and including a pair of spaced substantially parallel wall portions, a pair of spaced sidewall portions extending between said parallel wall portions;
    control means within said chamber operative to control air flow from said inlet to said outlet, said control means being pivotably supported about a laterally extending axis positioned approximately midway between said wall portions; and
    diffusion means positioned within said chamber between said inlet and said control means, said diffusion means comprising an arcuate perforated member extending between said wall portions and having a concave surface facing said inlet whereby said diffusion means may operate to distribute air flow from said inlet over substantially the entire transverse cross sectional area of said chamber with a maximum velocity air flow rate extending laterally approximately midway between said wall portions so as to facilitate control of said air flow to said outlet by said control means.

2. An air distribution apparatus as set forth in claim 1 wherein the perforated member includes openings therein and wherein the effective area of said openings in said perforated member is greater midway between said parallel wall portions than immediately adjacent said wall portions so as to provide a greater velocity air flow through the transverse center of said air distribution apparatus.

3. An air distribution apparatus as set forth in claim 1 wherein said control means comprises a damper movable between substantially fully open and substantially fully closed positions, said diffusion means being operable to distribute said air flow so as to exert a substantially equal pressure over the surface area of said damper regardless of the position thereof.

4. An air distribution apparatus as set forth in claim 3 further comprising means defining a stop surface positioned within said chamber in substantially parallel relationship to the air flow therethrough and engageable by said damper when said damper is in said fully open position, said stop means being operative to limit movement of said damper beyond said fully open position.

5. An air distribution apparatus as set forth in claim 4 wherein said stop means includes air flow deflection means operative to deflect said air flow from the leading edge of said damper.

6. An air distribution apparatus as set forth in claim 5 wherein said air flow deflection means comprises a flange portion positioned so as to overlie the leading edge of said damper when said damper is in engagement with said stop means so as to inhibit flutter of said damper when said damper is in said fully open position.

7. An air distribution apparatus as set forth in claim 6 wherein said stop means is positioned in close proximity to said diffusion means.

8. An air distribution apparatus for providing and controlling a supply of conditioned air to one or more spaces, said apparatus comprising:
   an air receiving chamber defined by spaced parallel wall portions and interconnecting sidewall portions having an inlet and an outlet spaced from said inlet, said chamber having a cross sectional size substantially larger than the cross section of said inlet;
   a damper pivotably supported within said chamber between said sidewalls and movable between substantially fully open and fully closed positions to control air flow from said inlet to said outlet;
   stop means positioned within said chamber and engageable by said damper when said damper is in said fully open position, said stop means being operative to limit movement of said damper beyond said fully open position, said stop means including air flow deflection means operative to deflect said air flow from the leading edge of said damper;
   diffusion means positioned within said chamber between said inlet and said damper, said diffusion means comprising an arcuately shaped perforated member having a plurality of relatively small closely spaced openings and a generally concave shape facing said inlet, said perforated member being positioned in generally overlying relationship with respect to said inlet and operative to distribute air flow from said inlet over substantially the entire transverse cross sectional area of said chamber with a maximum velocity flow rate being directed toward the pivotably supported area of said damper so as to facilitate control of said air flow to said outlet by said control means.

9. An air distribution apparatus as set forth in claim 8 wherein said perforated member extends between said spaced parallel wall portions and has opposite edges positioned in spaced relationship to respective of said interconnecting sidewall portions.

10. An air distribution apparatus as set forth in claim 9 wherein said stop means extends between and is secured to said interconnecting sidewall portions.

11. An air distribution apparatus as set forth in claim 1 wherein said chamber is defined by an outer shell having a generally rectangular cross sectional shape open at opposite ends thereof and having a peripheral flange provided on one end thereof projecting into said opening, a liner having a generally rectangular cross sectional shape smaller than said shell and being open at opposite ends thereof, one end of said liner projecting outwardly through said one end of said shell and beng supported by said flange portion.

12. An air distribution apparatus as set forth in claim 11 further comprising an inlet plate having an inlet opening provided therein secured to said one end of said liner, said inlet plate being selected from a group of inlet plates having varying size inlet openings therein so as to enable said air distribution apparatus to be adapted for use with wide range of different size air supply duct work systems.

13. An air distribution apparatus for use in providing conditioned air flow to one or more spaces, said apparatus comprising:
   a universally sized chamber defined by first and second substantially parallel spaced wall portions and a pair of spaced sidewall portions extending therebetween, first and second outer wall portions positioned in generally parallel outwardly spaced relationship to respective of said first and second wall portions and a pair of outer sidewall portions spaced outwardly from respective of said pair of sidewall portions, and insulation means positioned between said wall and sidewall portions and said outer wall and outer sidewall portions;
   said first and second wall portions and said pair of sidewall portions define a peripheral flange portion at one end thereof projecting outwardly from said chamber;
   an inlet plate adapted to be secured to said peripheral flange portion at said one end of said chamber, said inlet plate having inlet means defining an inlet opening adapted to be connected to a supply of conditioned air, said opening being selected from a range between a minimum and maximum size whereby said universally sized chamber may be used in conjunction with conditioned air supply systems within a range of sizes,
   the other end of said first and second wall portions and said pair of sidewall portions having a peripheral flange portion provided thereon adapted to be secured in engaging relationship with adjacent portions of said first and second outer wall portions and said second pair of outer sidewall portions;
   diffusion means positioned within said chamber and adapted to overlie said inlet opening, said diffusion means comprising an arcuate member extending between said parallel spaced wall portions having a concave surface facing said inlet and being operative to distribute said air flow from said inlet opening over substantially the entire cross sectional area of said chamber with a maximum velocity flow rate being directed approximately midway between said first and second wall portions; and
   control means within said chamber, said control means being operative to control air flow through said chamber from said inlet opening.

14. A universally sized variable volume air controller adapted to be connected to supply and distribution duct work of a building conditioned air distribution system so as to control air flow to selected spaces within said building, said air controller comprising:
   an outer shell of generally rectangular cross sectional shape open at opposite ends thereof and having a peripheral flange portion projecting inwardly at one of said open ends;
   a liner of generally rectangular cross sectional shape open at both ends thereof of a size less than said outer shell and having one end projecting outwardly through and supported by said peripheral flange portion, said liner including spaced upper and lower walls and interconnecting sidewalls;
   an inlet plate having an inlet opening therein secured to said one end of said liner, said inlet opening being adaptable to enable said universal air controller to be connected to substantially any size supply duct work;

an arcuate perforated member having a plurality of relatively small closely spaced openings therein overlying said inlet opening and presenting a generally concave surface facing said inlet, said perforated member extending between and secured to said upper and lower walls and having opposite ends spaced from said sidewalls;

a damper rotatably supported within said liner and including an actuating shaft extending outwardly from said shell, said actuating shaft being positioned approximately midway between said upper and lower walls;

motor means connected to said actuating shaft and operative to drive said damper between open and closed positions; and stop means positioned within said liner and engageable with said damper to limit rotational movement thereof beyond said fully open position, said stop means including air deflection means operative to deflect air from a leading edge of said damper when said damper is in a fully open position;

said perforated member being operative to provide a maximum velocity air flow through said controller at a location approximately midway between said upper and lower walls whereby said maximum velocity air flow will impinge on said damper in close proximity to the rotational axis thereof so as to facilitate control of said air flow by said damper.

15. An air distribution apparatus as set forth in claim 11 wherein the sidewalls of said liner are positioned in spaced relationship to the sidewall portions of said outer shell whereby fasteners may be applied to and penetrate said sidewall portions of said outer shell without penetrating said liner thereby avoiding potential leakage of air flow through said chamber.

* * * * *